US012781916B1

(12) United States Patent
Araujo Cavalcante et al.

(10) Patent No.: US 12,781,916 B1
(45) Date of Patent: Nov. 3, 2026

(54) MAGNETIC MOUNTING ENCLOSURE FOR FERROUS STRUCTURES

(71) Applicant: Tractian Technologies Inc, Atlanta, GA (US)

(72) Inventors: Thamires Araujo Cavalcante, São Paulo (BR); Flávio Roberto Bizerra Junior, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/364,824

(22) Filed: Oct. 21, 2025

Related U.S. Application Data

(60) Provisional application No. 63/886,545, filed on Sep. 23, 2025.

(51) Int. Cl.
*F16M 13/02* (2006.01)

(52) U.S. Cl.
CPC ................................. *F16M 13/022* (2013.01)

(58) Field of Classification Search
CPC . F16M 13/022; F21V 21/096; F21V 21/0965; Y10S 33/01; Y10S 206/819; Y10S 211/01; Y10S 206/01; Y10S 211/819; G01D 11/00
USPC ........ 248/683, 206.5, 467; D10/83; 362/398
See application file for complete search history.

(56) References Cited

U.S. PATENT DOCUMENTS 2,413,628 A * 12/1946 Paul .................... F21V 21/0965 33/DIG. 1
2,580,099 A * 12/1951 Jaeger ...................... B25H 3/04 211/DIG. 1
4,706,822 A * 11/1987 Remp, Jr. .............. B65D 85/20 206/443
5,577,697 A * 11/1996 Accordino ........... F16M 13/022 248/316.7
7,657,985 B2 * 2/2010 McClure ................ B23K 31/02 29/272

(Continued)

FOREIGN PATENT DOCUMENTS

KR 200489393 Y1 * 6/2019 ............. F21V 17/12

*Primary Examiner* — Jonathan Liu
*Assistant Examiner* — Guang H Guan
(74) *Attorney, Agent, or Firm* — Cognition IP, P.C.; Edward Steakley; Justin White

(57) ABSTRACT

A magnetic mounting enclosure for mounting an electronic device to a mechanical asset having a ferrous structure includes an outer housing and one or more magnetic components. The outer housing has recesses formed in a back wall to fasten the magnetic components therein. Each magnetic component has a geometry including a magnetic curved surface extending beyond and facing away from the back wall. The magnetic components facilitate coupling the magnetic mounting enclosure to a mechanical asset by placing the magnetic curved surfaces against a ferrous curved surface on the mechanical asset to form magnetic attachments thereto. The ferrous curved surface can be an outer cylindrical surface and the magnetic curved surfaces can be inner cylindrical surfaces having curvatures that substantially match the ferrous curved surface. Each magnetic component geometry can also include flat surfaces to facilitate alternative magnetic attachments to flat ferrous surfaces of mechanical assets.

17 Claims, 10 Drawing Sheets

(56) References Cited

U.S. PATENT DOCUMENTS

| | | | | |
|---|---|---|---|---|
| 7,905,623 | B2 * | 3/2011 | Chen | F21L 4/027<br>362/157 |
| 8,147,087 | B2 * | 4/2012 | Chen | F21V 21/0965<br>362/184 |
| 11,255,525 | B2 * | 2/2022 | Sergyeyenko | F21V 21/0832 |
| D992,365 | S * | 7/2023 | Burger | D7/637 |
| 2015/0091449 | A1 * | 4/2015 | Lemon | H05B 47/11<br>315/158 |

* cited by examiner

MAGNETIC MOUNTING ENCLOSURE FOR FERROUS STRUCTURES

CROSS-REFERENCE TO RELATED APPLICATIONS

This application claims the benefit of priority to U.S. Provisional Application No. 63/886,545, filed on Sep. 23, 2025, which is hereby incorporated by reference in its entirety.

TECHNICAL FIELD

The present disclosure relates generally to mechanical coupling arrangements, and more particularly to improved mounting arrangements for coupling mechanical components.

BACKGROUND

Industrial machinery often involves the implementation of sensors to monitor aspects and performance of machine operations. These can include, for example, vibration, temperature, current, pressure, moisture, and other types of industrial sensors. Mounting sensors to industrial machines and other items can involve glued, welded, screwed, and other types of arrangements to facilitate sensor to machine attachments. In some situations that involve ferrous items to be monitored by sensors, magnetic arrangements are sometimes used to facilitate a magnetic based mounting or attachment of a given sensor to an industrial machine or device.

Unfortunately, some industrial ferrous surfaces are not readily amenable to traditional magnetic mounting arrangements. Where pipes, conduits, and other industrial items can have significantly convex or otherwise curved surfaces, for example, traditional magnetic mounting arrangements intended for use across many devices and applications are often only designed for attachment to flat surfaces. Accordingly, use of such magnetic mounting arrangements can result in weak or inadequate mountings to pipes and other items having convex surfaces.

Although traditional ways of coupling industrial items with magnetic mounting arrangements have worked in the past, improvements are always helpful. In particular, what is desired are magnetic mounting arrangements that allow for magnetically coupling mechanical components to convex and other curved ferrous surfaces on industrial mechanical assets.

SUMMARY

It is an advantage of the present disclosure to provide improved magnetic mounting arrangements that allow for magnetically coupling mechanical components to convex and other curved ferrous surfaces on industrial mechanical assets. The disclosed features, apparatuses, systems, and methods relate to mounting arrangements that facilitate the magnetic mounting of sensors and other mechanical components to curved ferrous surfaces on industrial assets. In particular, the disclosed embodiments can involve magnetic mounting enclosures configured for mounting electronic devices to mechanical assets having ferrous structures with curved surfaces, such as pipes and other cylindrical objects. Such magnetic mounting enclosures can include outer housings and one or more magnetic components with customized geometries including curved surfaces coupled to the outer housings.

In various embodiments of the present disclosure, an electronic device can include a plurality of internal electronic components, an enclosure, and a first magnetic component. The enclosure can contain the plurality of internal electronic components therein and can have at least a front side and a back side. The first magnetic component can be coupled to the back side of the enclosure and can have a first geometry including a first magnetic curved surface facing away from the enclosure. The first magnetic component can be configured to facilitate coupling the electronic device to a first separate mechanical asset by placing the first magnetic curved surface against a ferrous curved surface on the first separate mechanical asset to form a magnetic attachment of the first magnetic component to the ferrous curved surface.

In various detailed embodiments, the electronic device can be an industrial sensor. The first magnetic component can be integrally formed from a homogenous material, such as neodymium or another suitable magnetic material. In some arrangements, the ferrous curved surface on the separate mechanical asset can be convex and the first magnetic curved surface can be concave and can correspond to the ferrous curved surface. The ferrous curved surface can be an outer cylindrical surface and the first magnetic curved surface can be an inner cylindrical surface having a curvature that substantially matches the ferrous curved surface. In some arrangements, the first geometry of the first magnetic component can further include one or more magnetic flat surfaces facing away from the enclosure, and the first magnetic component can be configured to facilitate coupling the electronic device to a second separate mechanical asset by placing the one or more magnetic flat surfaces against a ferrous flat surface on the second separate mechanical asset to form a magnetic attachment of the first magnetic component to the ferrous flat surface. The back side of the enclosure can include a recess formed therein, with the recess having a recess geometry that corresponds to the first geometry, and a lower portion of the first magnetic component can be contained within the recess. The first magnetic component can be coupled to the enclosure within the recess. The first magnetic component can include winged portions on opposite sides of the first magnetic curved surface, with the winged portions having openings configured to accept screws to fasten the first magnetic component to openings in the back side of the enclosure within the recess.

In further detailed embodiments, the electronic device can include a second magnetic component coupled to the back side of the enclosure and spaced apart from the first magnetic component. The second magnetic component can have a second geometry including a second magnetic curved surface facing away from the enclosure. The second magnetic component can also be configured to facilitate coupling the electronic device to the first separate mechanical asset by placing the second magnetic curved surface against the ferrous curved surface to form a magnetic attachment of the second magnetic component to the ferrous curved surface. The first geometry and the second geometry can be identical to each other. The first magnetic component and the second magnetic component can be arranged such that a primary axis of curvature for both of the first and second magnetic components falls along the same longitudinal axis. In some arrangements, the electronic device can also include a magnetic shield within the enclosure. This magnetic shield can be arranged to shield at least a portion of the plurality of internal electronic components from the magnetic force of the first magnetic component.

In further embodiments of the present disclosure, a magnetic mounting enclosure configured to mount an electronic device to a separate mechanical asset having a ferrous structure can include an outer housing, a first magnetic component, and a second magnetic component. The outer housing can have one or more walls defining an inner volume configured to hold internal components of the electronic device therein. The outer housing can include a back wall having a first recess formed proximate a top of the outer housing and a second recess formed proximate a bottom of the outer housing. The first magnetic component can be coupled to the back wall within the first recess and can have a first geometry including a first magnetic curved surface extending beyond and facing away from the back wall. The second magnetic component can be coupled to the back wall within the second recess and can have a second geometry including a second magnetic curved surface extending beyond and facing away from the outer housing. The first and second magnetic components can be configured to facilitate coupling the magnetic mounting enclosure to a first separate mechanical asset by placing the first and second magnetic curved surfaces against a ferrous curved surface on a ferrous structure of the first separate mechanical asset to form magnetic attachments of the first and second magnetic components to the ferrous curved surface.

In various detailed embodiments, the first and second magnetic components can be identical to each other. The ferrous curved surface can be an outer cylindrical surface and both of the first and second magnetic curved surfaces can be inner cylindrical surfaces having curvatures that substantially match the ferrous curved surface. The first and second magnetic components can be arranged such that a primary axis of curvature for both of the first and second magnetic components falls along the same longitudinal axis extending vertically from the top to the bottom of the outer housing. In some arrangements, each of the first and second magnetic components can further include multiple magnetic flat surfaces extending beyond and facing away from the outer housing. The first and second magnetic components can both be configured to facilitate coupling the magnetic mounting enclosure to a second separate mechanical asset by placing the multiple magnetic flat surfaces against a ferrous flat surface on a ferrous structure of the second separate mechanical asset to form a magnetic attachment of both of the first and second magnetic components to the ferrous flat surface.

In still further embodiments of the present disclosure, various methods of mounting an electronic device to a mechanical asset are provided. Pertinent process steps can include providing a magnetic mounting enclosure on the electronic device, aligning magnetic curved surfaces on the enclosure to match a ferrous curved surface of the mechanical asset, and placing the magnetic curved surfaces against the ferrous curved surface. The magnetic mounting enclosure can include an outer housing with a back wall, a first magnetic component having a first magnetic curved surface coupled to the back wall within a first recess therein, and a second magnetic component having a second magnetic curved surface coupled to the back wall within a second recess therein. The first and second magnetic curved surfaces on the first and second magnetic components can be aligned to match the curvature of the ferrous curved surface on a ferrous structure of the mechanical asset. Placing the first and second magnetic curved surfaces against the ferrous curved surface can form magnetic attachments of the first and second magnetic components to the ferrous curved surface, and the magnetic attachments can hold the electronic device in place against the mechanical asset. In some embodiments, providing the magnetic mounting enclosure on the electronic device can include creating the first and second magnetic components, wherein the first and second magnetic components include a customized geometry having the first and second magnetic curved surfaces, forming the enclosure outer housing including the first and second recesses in the outer housing back wall, assembling internal electronic components within the outer housing, and attaching the first and second magnetic components into the first and second recesses respectively.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, devices, systems, and methods of use for magnetic mounting enclosures, which can be used to mount or otherwise couple an industrial sensor or other mechanical component to a separate mechanical asset having a curved ferrous surface. These drawings in no way limit any changes in form and detail that may be made to the disclosure by one skilled in the art without departing from the spirit and scope of the disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving magnetic mounting arrangements. In particular, this can include industrial sensors, electronic devices, and other mechanical components having specialized magnetic mounting enclosures configured to mount their respective devices to curved surfaces on ferrous structures of separate mechanical assets. As one specific non-limiting example, the disclosed magnetic mounting enclosures can be used to mount industrial sensors to metallic pipes or other cylindrical objects within an industrial environment. This can involve the use of magnetic components with curved geometries as part of the magnetic mounting enclosures.

Although various embodiments disclosed herein discuss the specific application of mounting an industrial sensor to a metallic pipe or other cylindrical object within an industrial environment, it will be readily appreciated that the disclosed features, apparatuses, systems, and methods of use for magnetic mounting enclosures can also be used in other applications and environments where generically mounting a mechanical component to a mechanical asset having a curved ferrous surface is desired. Furthermore, while some examples are provided for specific features, components, and materials, it will be understood that these can be replaced with any suitable substitute or alternative features, components, and/or materials that take advantage of the disclosed embodiments and concepts. Other applications, arrangements, and extrapolations beyond the illustrated embodiments are also contemplated.

Figure 1:
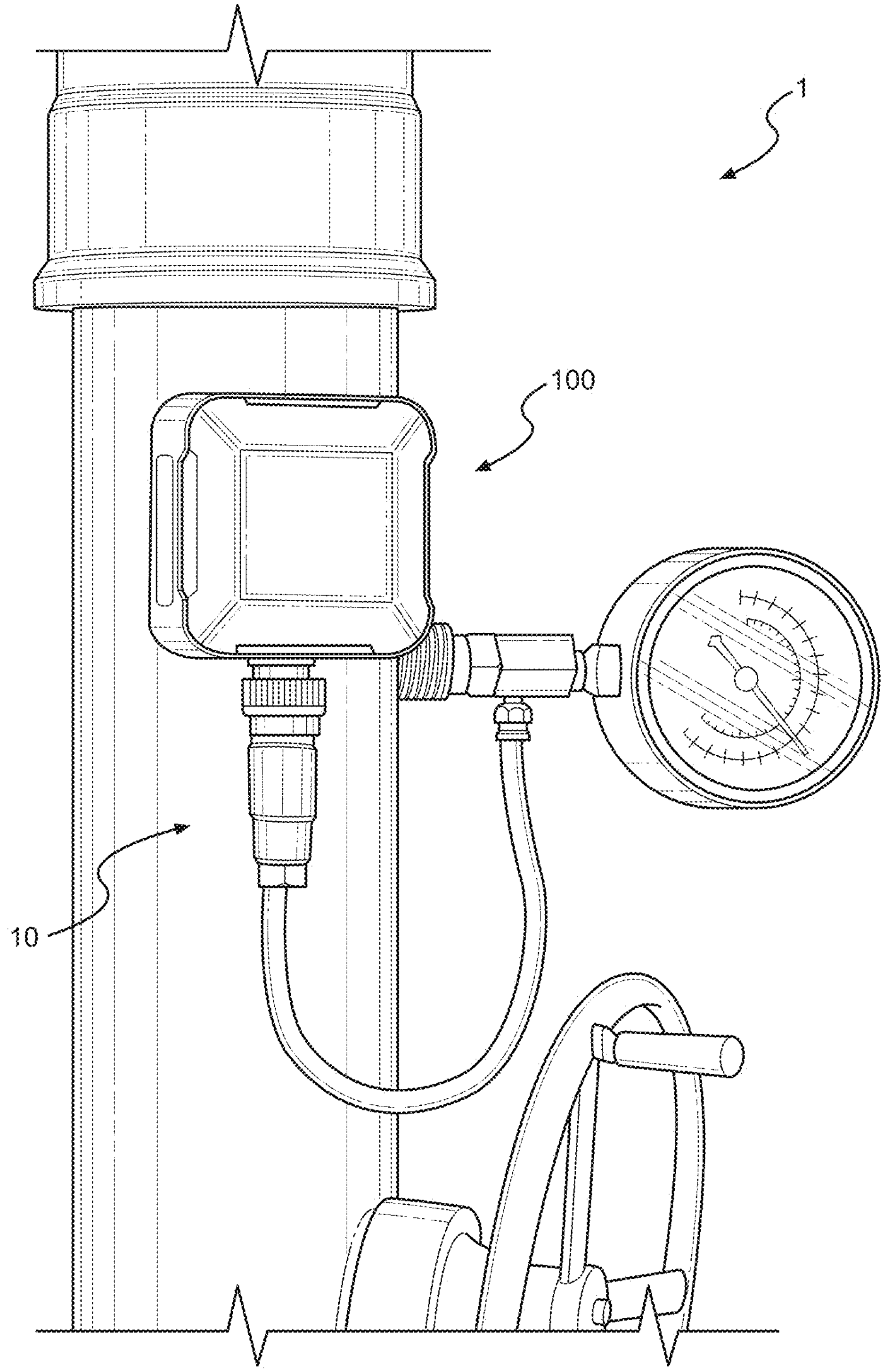
FIG. 1 illustrates in front perspective view an environment with an electronic device mounted to a ferrous structure of a mechanical asset using an example magnetic mounting enclosure according to one embodiment of the present disclosure.

Referring first to FIG. 1, an environment with an electronic device mounted to a ferrous structure of a mechanical asset using an example magnetic mounting enclosure is illustrated in front perspective view. Industrial environment 1 can include a relatively smaller electronic device 100 that is mounted to a relatively larger mechanical asset 10 by way of a magnetic mounting enclosure on the electronic device. In various arrangements, electronic device 100 can be an industrial sensor configured to measure vibration, temperature, current, pressure, moisture, for example, although other types of sensors or mechanical components are also possible. In various arrangements, mechanical asset 10 can be a vertically aligned ferrous pipe or conduit, for example, although other types of mechanical assets are also possible.

In various embodiments, electronic device 100 can be attached or coupled to mechanical asset 10 by way of its outer enclosure, which can be a magnetic mounting enclosure. Such a magnetic mounting enclosure can include an outer housing and one or more magnetic components coupled to a back wall of the outer housing. These magnetic components can have geometries that include curved surfaces to match or substantially approximate a curved ferrous surface of mechanical asset 10 such that surface area contact and magnetic forces are maximized from the magnetic components to the curved ferrous surface. While some mechanical assets may have a continuous or substantially large curved ferrous surface, such as that which is shown for mechanical asset 10, it will be readily appreciated that the magnetic mounting enclosure of electronic device 100 can be mounted to a mechanical asset having any suitable ferrous structure or portion thereof. Furthermore, while mechanical asset 10 is shown in FIG. 1 as being a vertically arranged pipe, it will be appreciated that electronic device 100 can be suitably oriented to facilitate a magnetic mounting to mechanical assets that are arranged horizontally or in other alternative directions.

Figure 2A:
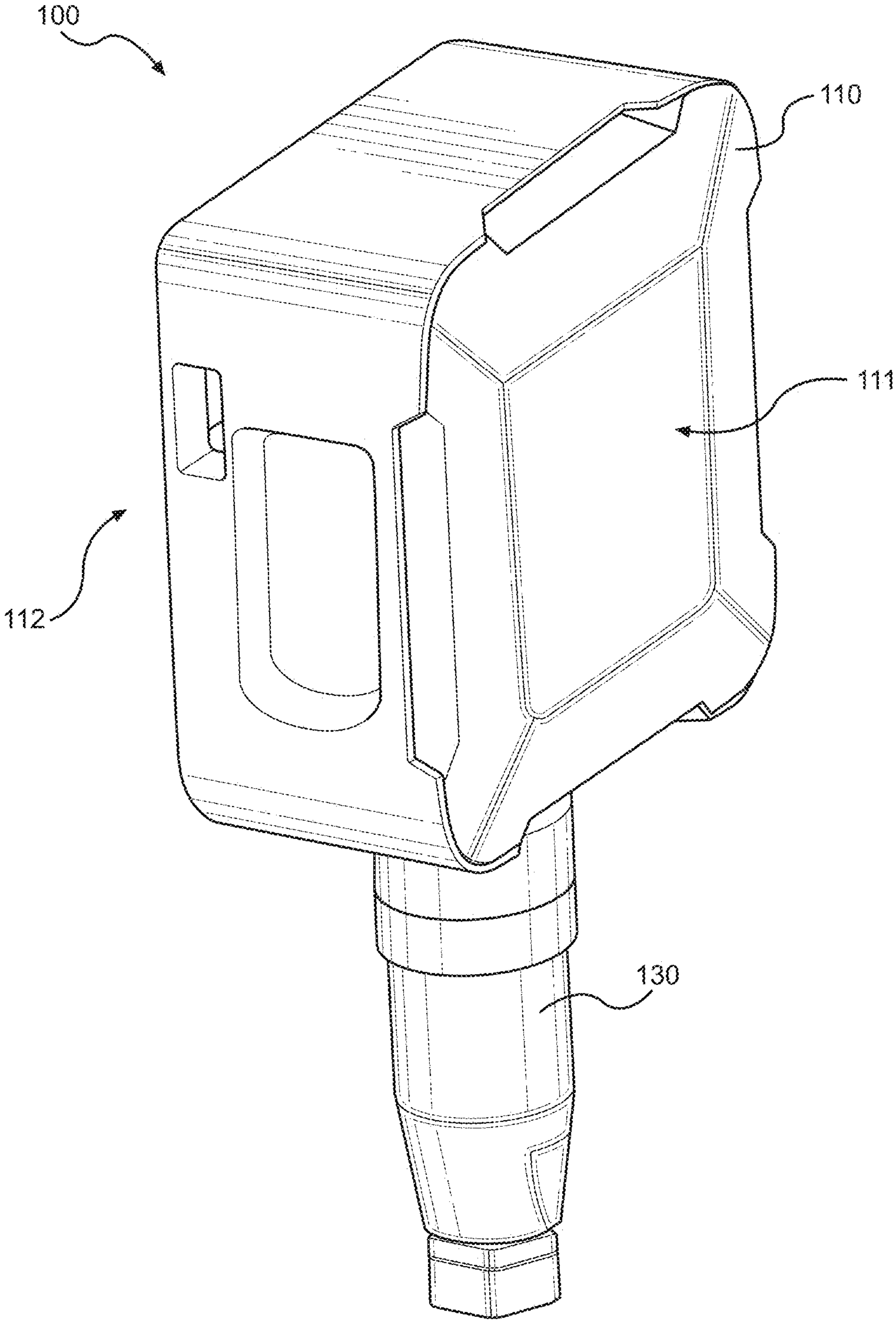
FIG. 2A illustrates in front perspective view an example electronic device with a magnetic mounting enclosure according to one embodiment of the present disclosure.
Figure 2B:
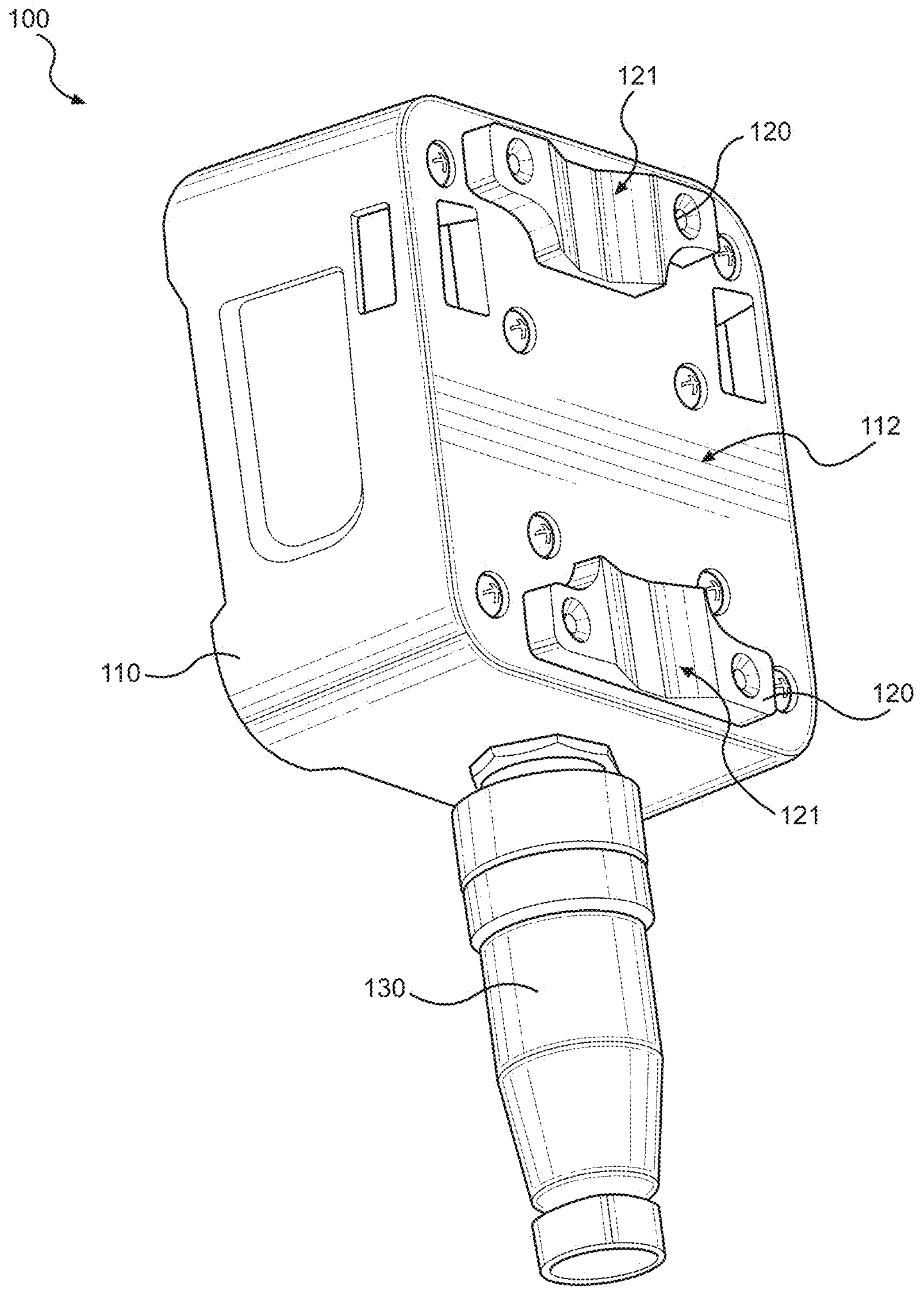
FIG. 2B illustrates in rear perspective view the electronic device with a magnetic mounting enclosure of FIG. 2A according to one embodiment of the present disclosure.

Turning next to FIGS. 2A and 2B, an example electronic device with a magnetic mounting enclosure is illustrated in front perspective and rear perspective view respectively. Electronic device 100 can include a plurality of internal electronic components (not shown) contained within an enclosure or outer housing 110, one or more magnetic components 120, and a coupling arrangement 130 configured to couple the electronic device to one or more external devices. Coupling arrangement 130 can include a coupling for an antenna, coaxial cable, multi-cable arrangement, or any other suitable communication component. In some arrangements, magnetic components 120 can be considered as part of enclosure or outer housing 110 to form an overall magnetic mounting enclosure.

Outer housing 110 can be box shaped and can have a front side 111, back side 112, and further additional sides therebetween, as shown. In some arrangements, outer housing 110 can have one or more walls (e.g., front, back, top, bottom, left side and right side walls) defining an inner volume configured to hold internal components of the electronic device therein. Each magnetic component 120 can be coupled to the back side of outer housing 110 and can have a geometry including a magnetic curved surface facing away from the outer housing or enclosure, such that each magnetic component is configured to facilitate coupling electronic device 100 to a separate mechanical asset. This can be done by placing each magnetic curved surface against a ferrous curved surface on the separate mechanical asset to form magnetic attachments of each magnetic component to the ferrous curved surface, as set forth in greater detail below.

As shown in FIG. 2B, electronic device 100 can include a first magnetic component 120 proximate its top and a second magnetic component 120 proximate its bottom. These first and second magnetic components 120 can be identical in some arrangements and can be arranged such that their curved surfaces align along a common axis of curvature to facilitate mounting to a ferrous curved surface of a separate mechanical asset. In alternative arrangements, a single magnetic component 120 can be used, while in other alternative arrangements more than two magnetic components can be used for a given magnetic mounting enclosure.

Figure 3:
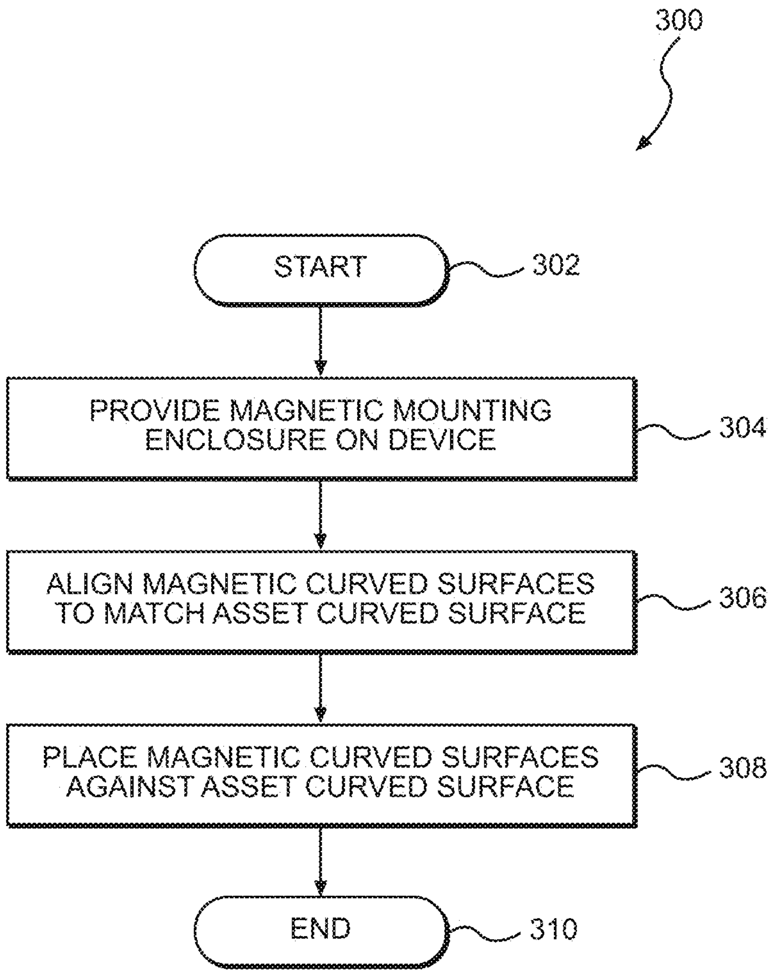
FIG. 3 illustrates a flowchart of an example summary method of mounting an electronic device to a mechanical asset according to one embodiment of the present disclosure.

Moving to FIG. 3, a flowchart is provided for an example summary method of mounting an electronic device to a mechanical asset, which can be done using a magnetic mounting enclosure on the electronic device. Summary method 300 can represent one broad aspect of various overall methods of mounting an electronic device or any other suitable mechanical component to a mechanical asset, and it will be understood that various other steps and details of such a broad aspect and overall methods are not provided here for purposes of simplicity. While summary method 300 and other disclosed methods can involve mounting an industrial sensor to a ferrous pipe or other cylindrical mechanical asset, for example, it is also contemplated that the various disclosed methods can alternatively be applied to other types of mechanical components and mechanical assets.

After a start step 302, a first process step 304 can involve providing a magnetic mounting enclosure on an electronic device. The magnetic mounting enclosure can include an outer housing with a back wall, a first magnetic component having a first magnetic curved surface coupled to the back wall within a first recess therein, and a second magnetic component having a second magnetic curved surface coupled to the back wall within a second recess therein.

At a following process step 306, the magnetic curved surfaces can be aligned to match the asset curved surface. This can involve aligning both of the first and second magnetic curved surfaces on the first and second magnetic components respectively to match the curvature of a ferrous curved surface on a ferrous structure of the mechanical asset.

The next process step 308 can involve placing the first and second magnetic curved surfaces up against the mechanical asset curved surface, which can be a ferrous curved surface. Such placement can form magnetic attachments of the first and second magnetic components to the ferrous curved surface of the mechanical asset. These magnetic attachments can function to hold the electronic device in place against the mechanical asset.

Summary method 300 can then end at end step 310. In some arrangements, one or more of the foregoing steps can be performed simultaneously or in a different order. For example, steps 306 and 308 can be performed simultaneously in some arrangements. Not all steps are necessary in all situations, and additional steps and details can be added. Further steps, details, and variations are provided in detailed method 600 set forth below.

Continuing with FIGS. 4A-4E, an example magnetic component for a magnetic mounting enclosure is illustrated in top perspective, rear perspective, rear elevation, bottom plan, and front elevation views respectively. Magnetic component 120 can be a specially designed magnet having a specific geometry that includes curved surface 121 configured to correspond to a ferrous curved surface of a separate mechanical asset, such as a metallic pipe or conduit. In some arrangements, this curved surface 121 can be a concave surface configured to match a ferrous convex surface of the separate mechanical asset. For example, curved surface 121 can define an inner cylindrical surface having a curvature that substantially matches a defined outer cylindrical surface at a ferrous structure of the separate mechanical asset, as shown in FIG. 1.

Figure 4A:
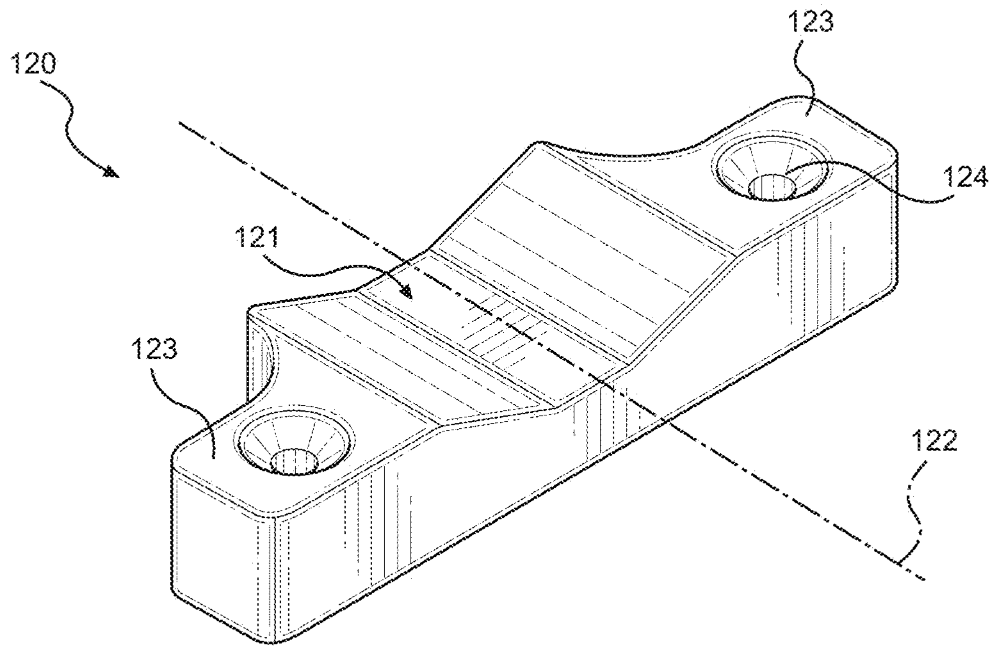
FIG. 4A illustrates in top perspective view an example magnetic component for a magnetic mounting enclosure according to one embodiment of the present disclosure.
Figure 4B:
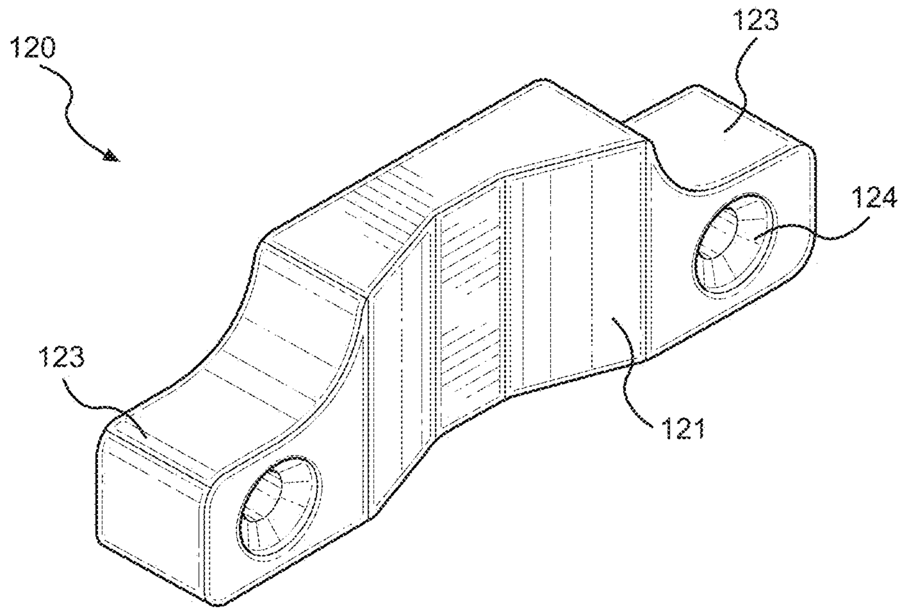
FIG. 4B illustrates in rear perspective view the magnetic component of FIG. 4A according to one embodiment of the present disclosure.
Figure 4C:
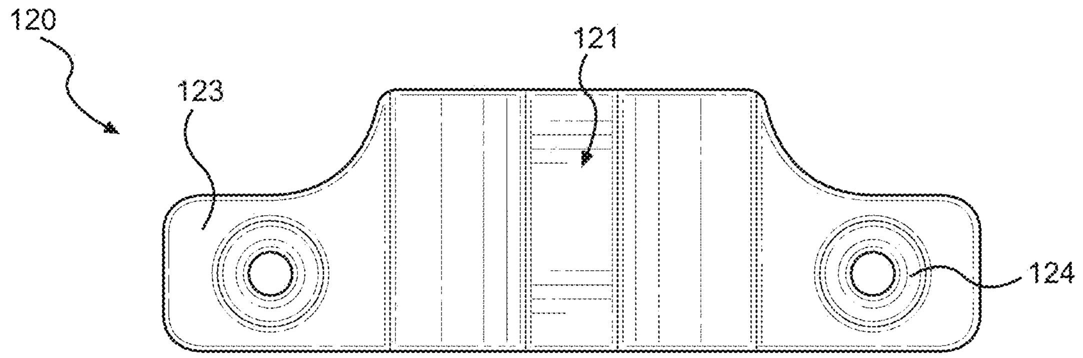
FIG. 4C illustrates in rear elevation view the magnetic component of FIG. 4A according to one embodiment of the present disclosure.
Figure 4D:
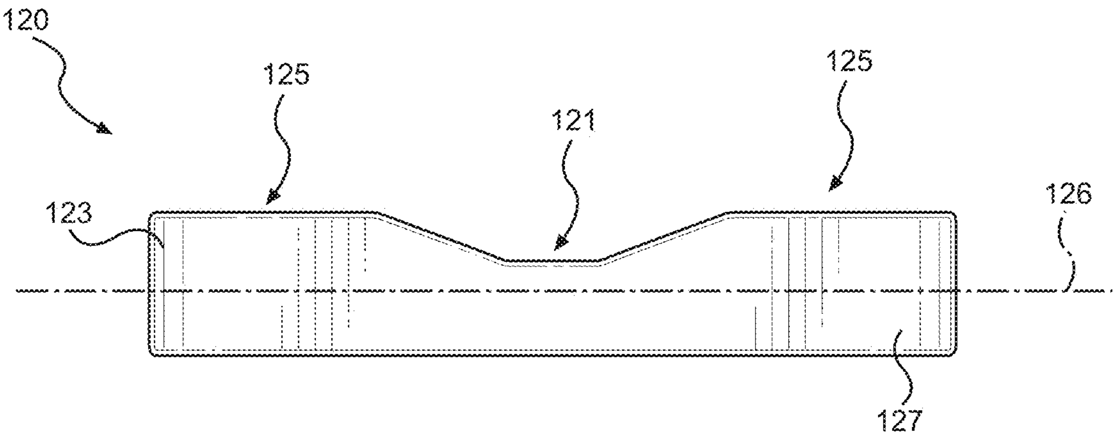
FIG. 4D illustrates in bottom plan view the magnetic component of FIG. 4A according to one embodiment of the present disclosure.
Figure 4E:
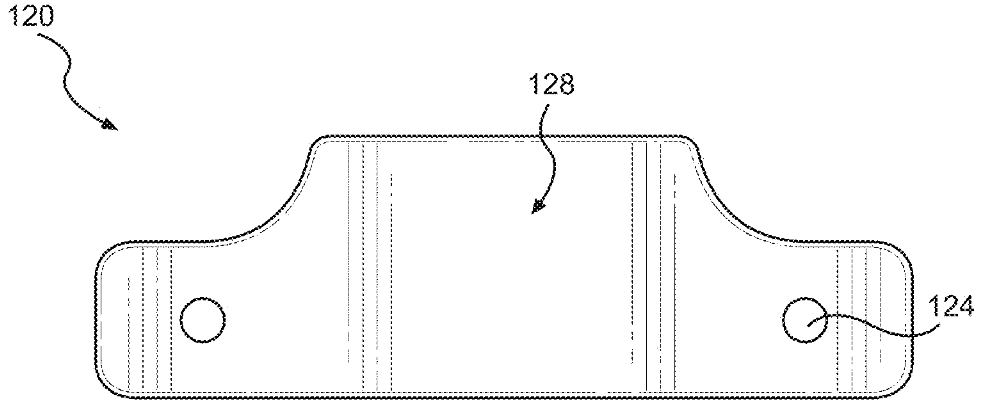
FIG. 4E illustrates in front elevation view the magnetic component of FIG. 4A according to one embodiment of the present disclosure.

In some arrangements, as oriented in FIGS. 4A and 4D, magnetic component 120 can have curved surface 121 having a primary axis of curvature 122 that extends longitudinally from a top to a bottom of the magnetic component. Magnetic component 120 can also include winged portions 123 on opposite sides of curved surface 121 that extend laterally away from the curved surface. Each winged portion 123 can include an opening 124 configured to facilitate attachment of the magnetic component to the outer housing of the electronic device, such as by accepting screws, bolts, nails, or the like therethrough. Each winged portion 123 can also include a flat upper surface 125 that is elevated above the level of curved surface. As shown in FIG. 4D, for example, surface 121 can be a nonplanar surface between winged portions 123 that is not necessarily a curved surface. As shown, this nonplanar surface 121 can include a downward slanting portion that slants downward from one flat upper surface 125, which continues to a flattened portion that is substantially parallel to flat upper surfaces 125, which continues to an upward slanting portion that slants upward to the other flat upper surface 125. Magnetic component 120 can also include a lower portion 127 below level 126 configured to be contained within a recess within the outer housing of the magnetic mounting enclosure. Bottom surface 128 on the bottom of lower portion 127 can be a flat surface on an opposite side of magnetic component 120 from curved surface 121 and raised flat surfaces 125. When attached to back wall 112 of outer housing 110, magnetic component 120 may be oriented differently from FIG. 4D. For example, as shown in FIGS. 2B and 5A, portion 127 is now oriented in the front as a front portion, surface 128 is now oriented in the front as a front surface defined by the front portion, and nonplanar surface 121 is now oriented in the back of a back portion behind the front portion.

In various embodiments, magnetic component 120 can be a single integrally formed part formed from a single homogenous magnetic material, such as neodymium. Other magnetic materials are also possible. Every surface of magnetic component 120 can thus be a magnetic surface. In alternative embodiments, magnetic component 120 can be formed from multiple parts, at least some of which are created from a magnetic material. For example, a base structure can have one or more strips of neodymium along curved surface 121 and raised flat surfaces 125, such that these surfaces are still magnetic surfaces. While curved surface 121 can have a specific geometry that facilitates a sufficient amount of surface contact with a corresponding curved ferrous surface on a separate mechanical asset or device to result in a strong magnetic attachment of curved surface 121 to the separate device, raised flat surfaces 125 can alternatively still allow magnetic component 120 to have sufficient amount of surface contact for a strong magnetic attachment to a flat ferrous surface on a separate mechanical asset or device. Accordingly, each magnetic component 120 can allow for magnetic mounting to an external curved surface or an external flat surface.

Figure 5A:
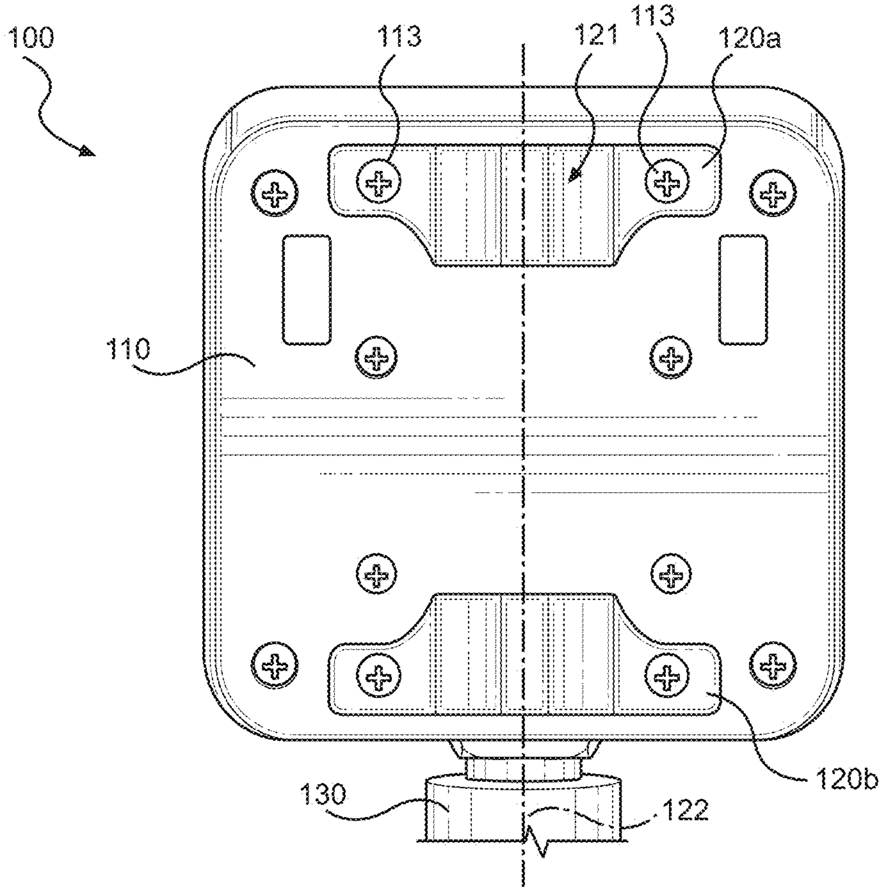
FIG. 5A illustrates in rear elevation view an example electronic device with a magnetic mounting enclosure according to one embodiment of the present disclosure.
Figure 5B:
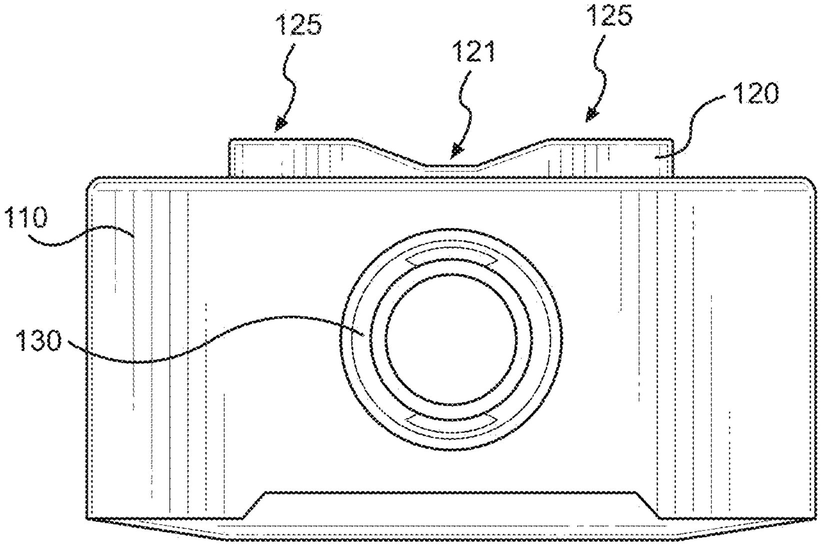
FIG. 5B illustrates in bottom plan view the electronic device with a magnetic mounting enclosure of FIG. 5A according to one embodiment of the present disclosure.

Next, FIGS. 5A and 5B show an example electronic device with a magnetic mounting enclosure in rear elevation and bottom plan views respectively. Electronic device 100 can include a magnetic mounting enclosure having an outer housing 110 and first and second magnetic components 120*a*, 120*b* coupled to a back wall of the outer housing. Electronic device can also include a coupling arrangement 130 extending from a bottom wall of outer housing 110. Again, outer housing 110 can have one or more walls defining an inner volume configured to hold internal components of the electronic device therein. First and second magnetic components 120*a*, 120*b* can be identical and can be arranged in mirrored positions with respect to each other. Each magnetic component 120*a*, 120*b* can be coupled to outer housing 110 within a respective recess in the back wall of outer housing, and each magnetic component can have a curved surface 121 extending beyond and facing away from the back wall, as well as raised flat surfaces 125 on opposite sides of the curved surface.

Each magnetic component 120*a*, 120*b* can be configured to facilitate coupling the magnetic mounting enclosure of electronic device 100 to a first separate mechanical asset by placing the magnetic curved surface 121 of each magnetic component against a ferrous curved surface on a ferrous structure of the first separate mechanical asset to form magnetic attachments of the first and second magnetic components to the ferrous curved surface.

Each magnetic component 120*a*, 120*b* can also be configured to facilitate coupling the magnetic mounting enclosure to a second separate mechanical asset by alternatively placing the multiple magnetic flat surfaces 125 against a ferrous flat surface on a ferrous structure of the second separate mechanical asset to form magnetic attachments of the first and second magnetic components to the ferrous flat surface.

Figure 5C:
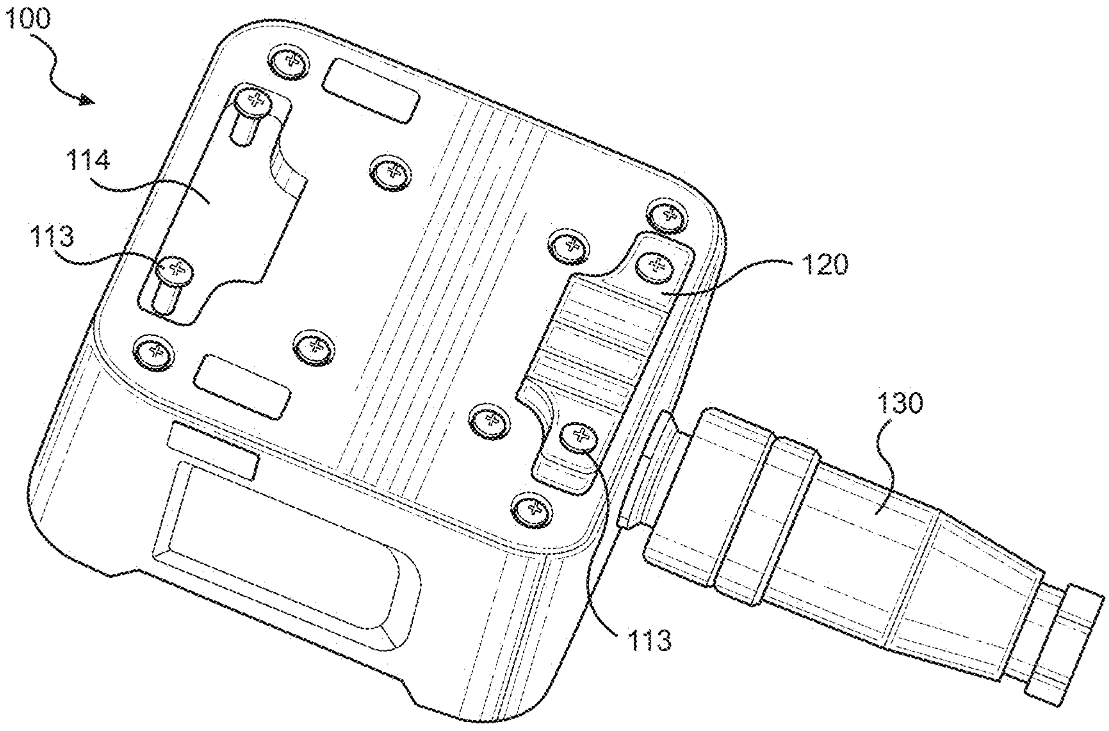
FIG. 5C illustrates in rear perspective view the electronic device of FIG. 5A with a top magnetic component removed according to one embodiment of the present disclosure.
Figure 5D:
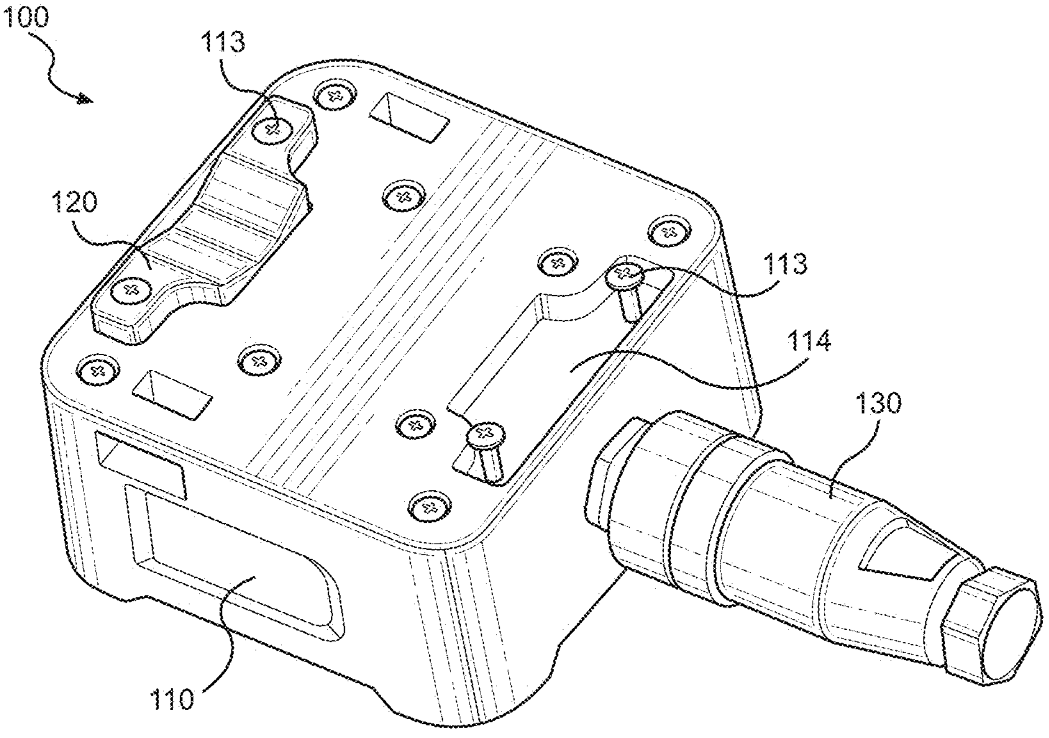
FIG. 5D illustrates in rear perspective view the electronic device of FIG. 5A with a bottom magnetic component removed according to one embodiment of the present disclosure.

FIGS. 5C and 5D depict in rear perspective views the electronic device with its top magnetic component removed and then with its bottom magnetic component removed. As shown, a recess 114 can be formed in the back wall of outer housing 110 for each magnetic component 120. A first recess 114 can be formed proximate a top of outer housing 110 for a first magnetic component 120 and a second recess 114 can be formed proximate a bottom of the outer housing for the second magnetic component 120. Similar to first and second magnetic components 120, first and second recesses 114 can be identical and can be arranged in mirrored positions to each other. Each recess 114 can have a recess geometry that can be sized and shaped such that a respective magnetic component 120 can fit within the recess. This can involve the entire lower portion 127 of a magnetic component 120 fitting within a respective recess 114, which can have a corresponding depth therefor. One or more screws 113 can be used to fasten each magnetic component 120 to outer housing 110, such as by extending screws through each opening 124 in a magnetic component and into a corresponding opening in the outer housing within a respective recess 114 where the magnetic component is fastened.

Figure 5E:
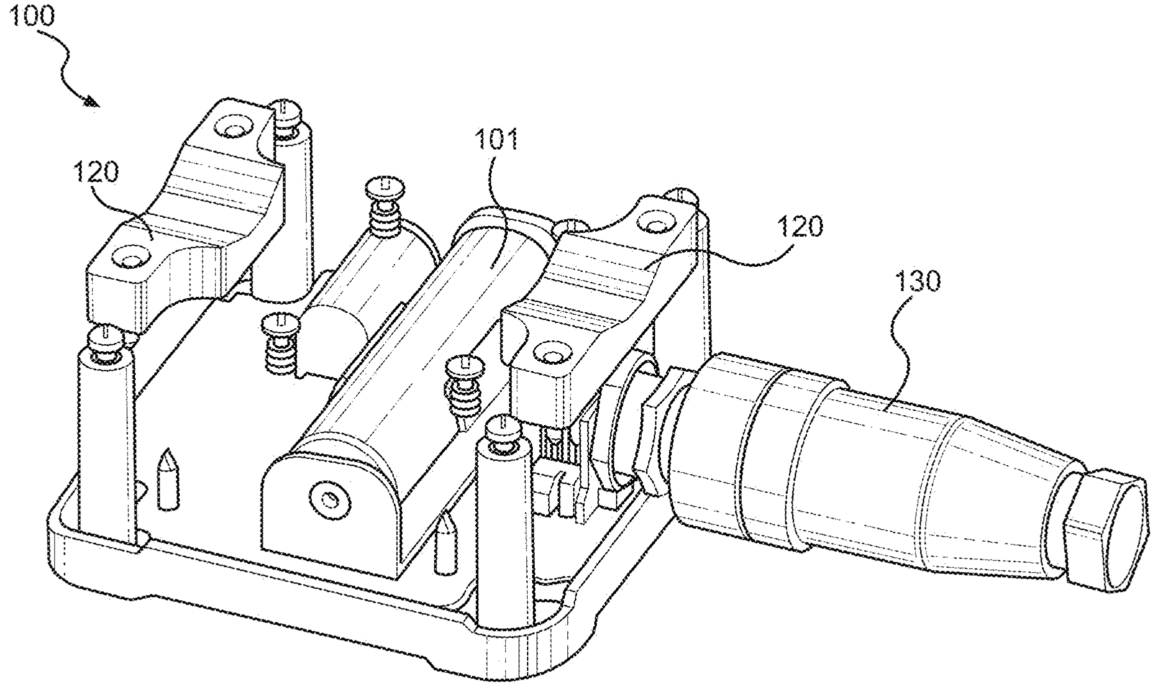
FIG. 5E illustrates in rear perspective view the electronic device of FIG. 5A with its back and side walls removed according to one embodiment of the present disclosure.

FIG. 5E illustrates in rear perspective view the electronic device with its back and side walls removed. As shown, some portions of the outer housing for electronic device 100 are removed to reveal various internal electronic components within the inner volume of the outer housing, such as battery 101. In some arrangements, a magnetic shield (not shown) can be placed within the enclosure, with such a magnetic shield being arranged to shield at least a portion of the plurality of internal electronic components from the magnetic force of magnetic components 120. For example, a thin polycarbonate or nonferrous layer can be placed behind the back wall of the outer enclosure to protect internal components from the magnetic force of one or both magnetic components 120.

Figure 5F:
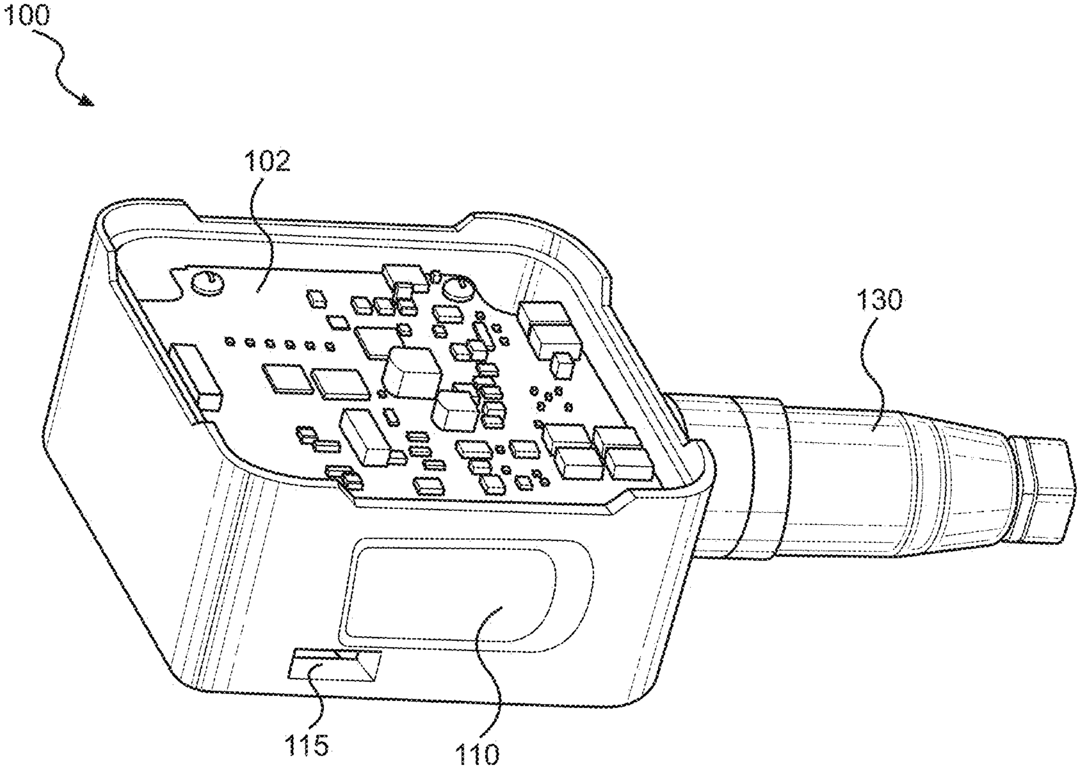
FIG. 5F illustrates in rear perspective view the electronic device of FIG. 5A with its magnetic components and back wall removed according to one embodiment of the present disclosure.

FIG. 5F illustrates in rear perspective view the electronic device with its magnetic components and back wall removed. In this alternative view of electronic device 100, only the back wall of outer housing 110 is removed to show other internal electronic components within the inner volume, such as printed circuit board 102. In addition to the magnetic components attached to the back wall, outer housing 110 can also include one or more physical openings 115 along its outer walls. Such physical openings 115 can be used to couple or attach a tether or other mounting component to provide a further mounting arrangement or force in addition to the mounting arrangement and magnetic forces of magnetic components 120. A separate thin tether or harness (not shown), for example, can be strung through one or more physical openings 115 on the left and right sides of outer housing 110, with the tether or harness then being tied or otherwise coupled to the separate mechanical asset or another suitable separate item to reinforce the mounting of electronic device 100.

Figure 6:
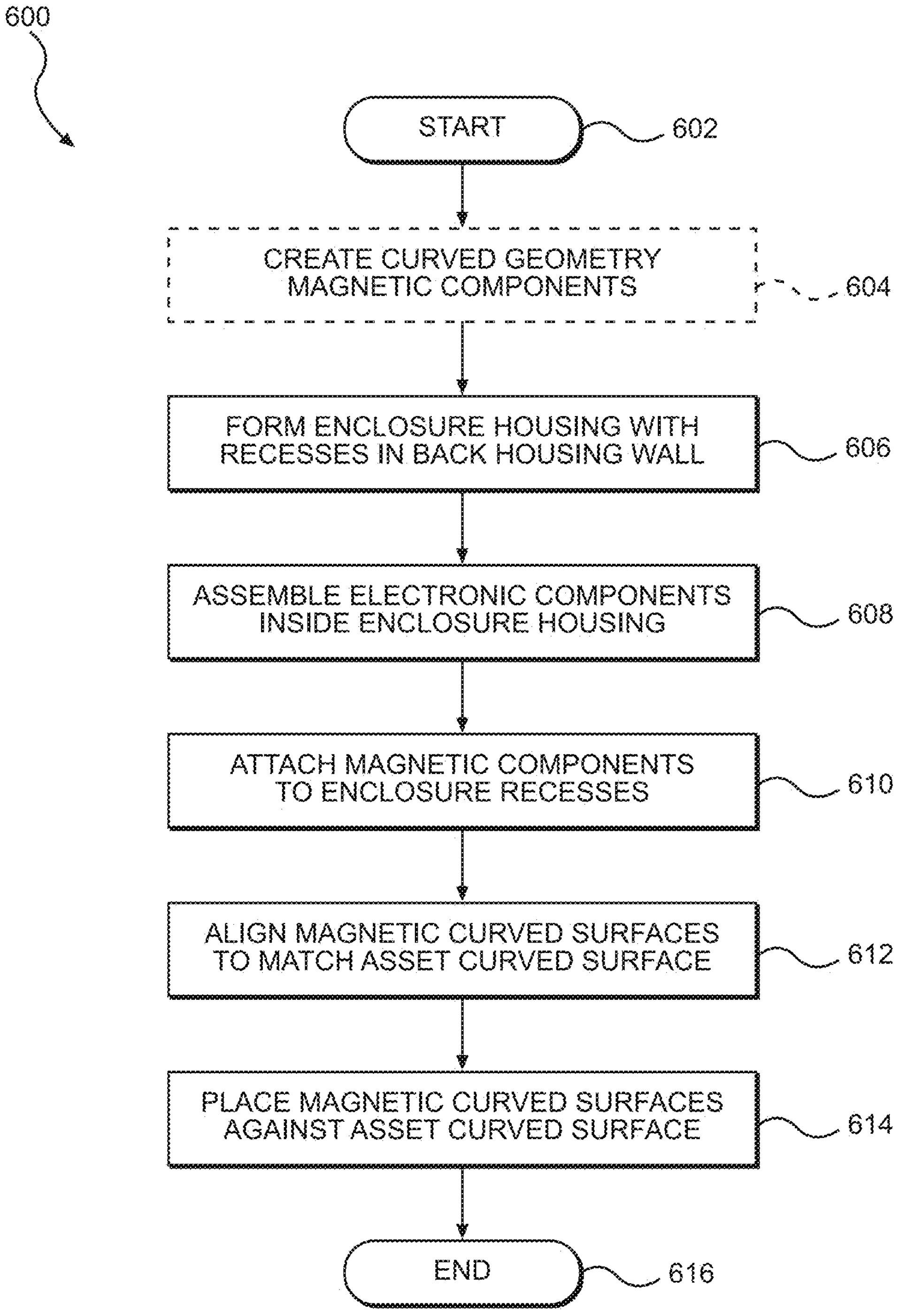
FIG. 6 illustrates a flowchart of an example detailed method of mounting an electronic device to a mechanical asset using a magnetic mounting enclosure according to one embodiment of the present disclosure.

Lastly, FIG. 6 provides a flowchart of a detailed method of mounting an electronic device to a mechanical asset using a magnetic mounting enclosure. Detailed method 600 can represent one possible way of mounting an electronic device to a mechanical asset, and it will be understood that various other steps, features, and details of such a detailed method are not provided here for purposes of simplicity. Detailed method 600 can include some or all steps and details of summary method 200 above, as will be readily appreciated. While detailed method 600 specifically contemplates mounting an industrial sensor to a mechanical asset having a curved ferrous surface, it will be readily appreciated that other mechanical components and/or other mechanical assets can alternatively be used.

After a start step 602, a first optional process step 604 can involve creating first and second magnetic components, such as magnetic components 120 disclosed above. Each magnetic component can have a customized geometry that includes a magnetic curved surface. As noted above, the magnetic curved surface can have a geometry that matches or substantially corresponds to a ferrous curved surface of one or more external mechanical assets, such as a pipe or other cylindrical object. As also noted above, the magnetic components can be integrally formed from a homogenous neodymium material and can also include winged portions having raised flat surfaces that are configured to facilitate magnetic attachments to ferrous flat surfaces of one or more external mechanical assets.

At the next process step 606, an enclosure outer housing can be formed. The outer housing can be that which is disclosed above, and as such can include first and second recesses in an outer housing back wall. The recesses can have geometries that correspond to the geometries of the first and second magnetic components, such that the magnetic components can fit snugly within the recesses.

Subsequent process step 608 can involve assembling internal electronic components within the outer housing. This can include arrangement components such as a battery, printed circuit board, connector coupling, and other electronic parts within the outer housing. In some arrangements, this can also involve placing a magnetic shield within the outer housing.

At the next process step 610, the magnetic components can be attached to the outer housing. This can involve attaching the first and second magnetic components into the first and second recesses respectively, such as by inserting screws or other fasteners through openings in the magnetic components and in the outer housing inside the recesses.

A following process step 612 can involve aligning the magnetic curved surfaces of the magnetic components to match the ferrous curved surface of the mechanical asset. Step 612 can be identical or substantially similar to step 306 above in some arrangements.

The next process step 614 can involve placing the magnetic curved surfaces against the ferrous curved surface of the mechanical asset, which can then mount the electronic device to the mechanical asset. Step 614 can be identical or substantially similar to step 308 above in some arrangements.

The method can then end at step 616. For foregoing detailed method 600, it will be appreciated that not all process steps are necessary, and that other process steps may be added in some arrangements. For example, some or all of steps 604 through 608 may be unnecessary where a fully assembled electronic device with a magnetic mounting enclosure already exists. Steps can also be performed in different orders where practical, and some steps can be performed simultaneously. For example, steps 606 and 608 can be performed at the same time. Although known process steps are provided for the various techniques in detailed method 600, it will be appreciated that other similar methods for mounting an electronic device or other suitable mechanical component to a mechanical asset having a curved ferrous surface using a magnetic mounting enclosure are also possible.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details but rather is to be defined by the scope of the appended claims.

What is claimed is:

1. An electronic device, comprising:

a plurality of internal electronic components;

an enclosure containing the plurality of internal electronic components therein, the enclosure having a plurality of walls including at least a back wall with a first recess formed in the back wall, wherein the first recess includes recess openings therein; and a first magnetic component coupled to the back wall of the enclosure, the first magnetic component having a first geometry including a front portion, a first magnetic nonplanar surface facing away from the enclosure, and winged portions on opposite sides of the first magnetic nonplanar surface, wherein the first magnetic component is located within the first recess such that the front portion is contained within the first recess and the first magnetic nonplanar surface extends outside the first recess and beyond an outer surface of the back wall, wherein the winged portions include openings configured to accept screws to fasten the first magnetic component to the back wall of the enclosure through the recess openings, and wherein the first magnetic component is configured to facilitate coupling the electronic device to a first separate mechanical asset by placing the first magnetic nonplanar surface against a ferrous curved surface on the first separate mechanical asset to form a magnetic attachment of the first magnetic component to the ferrous curved surface.

2. The electronic device of claim 1, wherein the electronic device is an industrial sensor.

3. The electronic device of claim 1, wherein the first magnetic component is integrally formed from a homogenous neodymium material.

4. The electronic device of claim 1, wherein the first magnetic nonplanar surface defines a geometry that is configured to correspond to a geometry of the ferrous curved surface.

5. The electronic device of claim 1, wherein the first geometry further includes one or more magnetic flat surfaces facing away from the enclosure, the first magnetic component being configured to facilitate coupling the electronic device to a second separate mechanical asset by placing the one or more magnetic flat surfaces against a ferrous flat surface on the second separate mechanical asset to form a magnetic attachment of the first magnetic component to the ferrous flat surface.

6. The electronic device of claim 1, wherein the plurality of internal electronic components includes a battery and a printed circuit board.

7. The electronic device of claim 1, wherein the enclosure includes one or more physical openings along the plurality of walls, the one or more physical openings being configured to facilitate coupling a separate tether to the enclosure.

8. The electronic device of claim 1, further comprising:

a second magnetic component coupled to the back wall of the enclosure within a second recess formed in the back wall and spaced apart from the first magnetic component, the second magnetic component having a second geometry including a second magnetic nonplanar surface facing away from the enclosure, wherein the second magnetic component is also configured to facilitate coupling the electronic device to the first separate mechanical asset by placing the second magnetic nonplanar surface against the ferrous curved surface to form a magnetic attachment of the second magnetic component to the ferrous curved surface.

9. The electronic device of claim 8, wherein the first geometry and the second geometry are identical to each other.

10. The electronic device of claim 8, wherein the first magnetic component and the second magnetic component are arranged along a common longitudinal axis.

11. A method of mounting the electronic device of claim 8 to at least one mechanical asset, the method comprising:

providing the electronic device of claim 8;

aligning the first and second magnetic nonplanar surfaces on the first and second magnetic components to match a curvature of a ferrous curved surface on a ferrous structure of the at least one mechanical asset; and placing the first and second magnetic nonplanar surfaces against the ferrous curved surface on the ferrous structure to form magnetic attachments of the first and second magnetic components to the ferrous curved surface on the ferrous structure, wherein the magnetic attachments hold the electronic device in place against the at least one mechanical asset.

12. The method of claim 11, wherein providing the electronic device includes:

creating the first and second magnetic components;

forming the enclosure with an outer housing including the plurality of walls;

assembling the plurality of internal electronic components within the outer housing; and attaching the first and second magnetic components into the first and second recesses respectively.

13. An electronic device, comprising:

a plurality of internal electronic components;

an outer housing having a plurality of walls defining an inner volume that contains the plurality of internal electronic components therein, wherein the plurality of walls includes a back wall having a first recess formed proximate a top of the outer housing and a second recess formed proximate a bottom of the outer housing, each of the first and second recesses having recess openings therein;

a first magnetic component coupled to the back wall, the first magnetic component having a first geometry including a first front portion, a first front surface at a front of the first front portion, a first back portion behind the first front portion, a first magnetic nonplanar surface at a back of the first back portion, and first winged portions on opposite sides of the first magnetic nonplanar surface, wherein the first front portion is located within the first recess, the first back portion is located outside the first recess and outside the outer housing, the first winged portions include openings configured to accept screws to fasten the first magnetic component to the back wall of the outer housing through the recess openings in the first recess, and the first magnetic nonplanar surface is located outside the first recess and the outer housing and is spaced beyond the back wall; and a second magnetic component coupled to the back wall, the second magnetic component having a second geometry including a second front portion, a second front surface at a front of the second front portion, a second back portion behind the second front portion, a second magnetic nonplanar surface at a back of the second back portion, and second winged portions on opposite sides of the second magnetic nonplanar surface, wherein the second front portion is located within the second recess, the second back portion is located outside the second recess and outside the outer housing, the second winged portions include openings configured to accept screws to fasten the second magnetic component to the back wall of the outer housing through the recess openings in the second recess, and the second magnetic nonplanar surface is located outside the second recess and the outer housing and is spaced beyond the back wall.

14. The electronic device of claim 13, wherein the first and second magnetic components are configured to facilitate coupling the electronic device to a first separate mechanical asset by placing the first and second magnetic nonplanar surfaces against a ferrous curved surface on a ferrous structure of the first separate mechanical asset to form magnetic attachments of the first and second magnetic components to the ferrous curved surface.

15. The electronic device of claim 13, wherein the first and second magnetic components are identical to each other.

16. The electronic device of claim 15, wherein each of the first and second magnetic components further includes multiple magnetic flat surfaces extending beyond and facing away from the outer housing.

17. The electronic device of claim 16, wherein the multiple magnetic flat surfaces of each of the first and second magnetic components are configured to facilitate coupling the electronic device to a second separate mechanical asset by placing the multiple magnetic flat surfaces of each of the first and second magnetic components against a ferrous flat surface on a ferrous structure of the second separate mechanical asset to form magnetic attachments of the first and second magnetic components to the ferrous flat surface.

* * * * *